US011277586B2

(12) United States Patent
Ratsch et al.

(10) Patent No.: US 11,277,586 B2
(45) Date of Patent: Mar. 15, 2022

(54) METHOD, SYSTEM AND APPARATUS FOR CONVEYING PERSONALIZED CONTENT TO A VIEWER

(75) Inventors: Peter Werner Ratsch, Toronto (CA); Maarten Boudewijn Heilbron, Toronto (CA); Ovidiu Octavian Popa, Richmond Hill (CA)

(73) Assignee: BCE INC., Verdun (CA)

(*) Notice: Subject to any disclaimer, the term of this patent is extended or adjusted under 35 U.S.C. 154(b) by 460 days.

(21) Appl. No.: 12/063,639

(22) PCT Filed: Sep. 1, 2006

(86) PCT No.: PCT/CA2006/001440
§ 371 (c)(1),
(2), (4) Date: Feb. 12, 2008

(87) PCT Pub. No.: WO2008/025121
PCT Pub. Date: Mar. 6, 2008

(65) Prior Publication Data
US 2010/0180295 A1  Jul. 15, 2010

(51) Int. Cl.
*H04N 7/16* (2011.01)
*H04N 21/488* (2011.01)
(Continued)

(52) U.S. Cl.
CPC ....... *H04N 7/163* (2013.01); *H04N 21/26216* (2013.01); *H04N 21/4345* (2013.01); *H04N 21/4882* (2013.01); *H04N 21/6543* (2013.01)

(58) Field of Classification Search
CPC .. H04N 21/26; H04N 21/26216; H04N 21/43; H04N 21/4345; H04N 21/4882; H04N 21/6543; H04N 7/163
(Continued)

(56) References Cited

U.S. PATENT DOCUMENTS

| 5,210,611 A | 5/1993 | Yee et al. |
| 5,555,441 A | 9/1996 | Haddad |

(Continued)

FOREIGN PATENT DOCUMENTS

| CA | 2416182 A1 | 1/2002 |
| EP | 0 263 635 A2 | 4/1988 |

(Continued)

OTHER PUBLICATIONS

Office Action dated Jan. 20, 2010 in connection with U.S. Appl. No. 11/571,041, 25 pages.
(Continued)

*Primary Examiner* — Farzana Hossain

(57) ABSTRACT

A method, system and apparatus for conveying personalized content to a viewer associated with a receiver are disclosed. In some embodiments, the method comprises generating control data indicative of a receiver-accessible source of personalized content for the viewer and inserting the control data into a plurality of control streams for transmission to the receiver, each of the control streams being accessible to the receiver when in a different respective operational state. The type of personalized content may include, but is not limited to, an instant message, an e-mail message, a file, a personalized report, a new television channel within a system for causing a channel change, a pay-per-view program, a video-on-demand program, a personalized message, etc.

16 Claims, 5 Drawing Sheets

(51) Int. Cl.
  *H04N 21/434* (2011.01)
  *H04N 21/6543* (2011.01)
  *H04N 21/262* (2011.01)
(58) Field of Classification Search
  USPC .................................................. 725/34, 38
  See application file for complete search history.

(56) References Cited

U.S. PATENT DOCUMENTS

| | | |
|---|---|---|
| 5,793,438 A | 8/1998 | Bedard |
| 5,861,881 A | 1/1999 | Freeman et al. |
| 6,029,045 A * | 2/2000 | Picco et al. ............... 725/34 |
| 6,047,327 A | 4/2000 | Tso et al. |
| 6,324,694 B1 | 11/2001 | Watts et al. |
| 6,405,372 B1 | 6/2002 | Kim et al. |
| 6,536,041 B1 | 3/2003 | Knudson et al. |
| 6,766,524 B1 | 7/2004 | Matheny et al. |
| 6,774,926 B1 | 8/2004 | Ellis et al. |
| 6,792,618 B1 | 9/2004 | Bendinelli et al. |
| 6,839,901 B1 | 1/2005 | De Saint Marc et al. |
| 7,174,560 B1 * | 2/2007 | Crinon ..................... 725/60 |
| 7,191,243 B2 | 3/2007 | Roy et al. |
| 7,360,160 B2 | 4/2008 | Matz |
| 7,360,230 B1 | 4/2008 | Paz et al. |
| 7,650,423 B2 | 1/2010 | Carden |
| 2001/0003846 A1 | 6/2001 | Rowe et al. |
| 2001/0013125 A1 * | 8/2001 | Kitsukawa et al. ........... 725/36 |
| 2001/0054182 A1 | 12/2001 | Lodola |
| 2002/0013943 A1 | 1/2002 | Haberman et al. |
| 2002/0026462 A1 | 2/2002 | Shotton, Jr. et al. |
| 2002/0040482 A1 | 4/2002 | Sextro et al. |
| 2002/0059586 A1 | 5/2002 | Carney et al. |
| 2002/0059590 A1 * | 5/2002 | Kitsukawa et al. ........... 725/36 |
| 2002/0065678 A1 | 5/2002 | Peliotis et al. |
| 2002/0083453 A1 * | 6/2002 | Menez ..................... 725/47 |
| 2002/0143591 A1 | 10/2002 | Connelly |
| 2002/0144283 A1 | 10/2002 | Headings et al. |
| 2002/0152467 A1 * | 10/2002 | Fiallos ............... H04N 21/8166 725/50 |
| 2002/0157101 A1 | 10/2002 | Schrader et al. |
| 2002/0166119 A1 * | 11/2002 | Cristofalo ................ 725/34 |
| 2002/0166122 A1 | 11/2002 | Kikinis et al. |
| 2002/0186296 A1 | 12/2002 | Gogoi et al. |
| 2002/0188943 A1 * | 12/2002 | Freeman et al. ........... 725/38 |
| 2003/0004961 A1 | 1/2003 | Slothouber et al. |
| 2003/0007092 A1 | 1/2003 | Sonner et al. |
| 2003/0027592 A1 | 2/2003 | Hashimoto et al. |
| 2003/0067554 A1 | 4/2003 | Klarfeld et al. |
| 2003/0084449 A1 | 5/2003 | Chane et al. |
| 2003/0133043 A1 | 7/2003 | Carr |
| 2003/0149975 A1 * | 8/2003 | Eldering et al. ............ 725/34 |
| 2003/0222975 A1 | 12/2003 | Klosterman |
| 2003/0233241 A1 | 12/2003 | Marsh |
| 2004/0022278 A1 | 2/2004 | Thomas et al. |
| 2004/0034873 A1 | 2/2004 | Zenoni |
| 2004/0045028 A1 | 3/2004 | Harris |
| 2004/0073437 A1 | 4/2004 | Halgas, Jr. et al. |
| 2004/0073923 A1 | 4/2004 | Wasserman |
| 2004/0109436 A1 | 6/2004 | Vargas et al. |
| 2004/0111742 A1 * | 6/2004 | Hendricks ............. H04H 20/10 725/34 |
| 2004/0111756 A1 | 6/2004 | Stuckman et al. |
| 2004/0128693 A1 * | 7/2004 | Weigand ............. H04N 7/17318 725/95 |
| 2004/0187151 A1 | 9/2004 | Dunstan |
| 2004/0226043 A1 * | 11/2004 | Mettu ................ H04H 60/52 725/46 |
| 2005/0015803 A1 | 1/2005 | Macrae et al. |
| 2005/0097600 A1 | 5/2005 | Heer |
| 2005/0097619 A1 | 5/2005 | Haddad |
| 2005/0210502 A1 * | 9/2005 | Flickinger et al. ......... 725/34 |
| 2005/0251826 A1 | 11/2005 | Orr |
| 2006/0064721 A1 | 3/2006 | Del Val et al. |
| 2006/0123455 A1 | 6/2006 | Pai et al. |
| 2006/0184989 A1 | 8/2006 | Slothouber |
| 2006/0190964 A1 * | 8/2006 | Eldering ................ H04N 7/165 725/42 |
| 2007/0079325 A1 * | 4/2007 | de Heer ..................... 725/32 |
| 2007/0143783 A1 * | 6/2007 | Wagner et al. ................ 725/30 |
| 2008/0301736 A1 * | 12/2008 | Heilbron ................ H04N 7/173 725/61 |
| 2009/0031335 A1 * | 1/2009 | Hendricks ............. H04N 7/163 725/1 |
| 2009/0254962 A1 * | 10/2009 | Hendricks ............ H04N 7/0887 725/116 |

FOREIGN PATENT DOCUMENTS

| | | |
|---|---|---|
| EP | 0920207 | 6/1999 |
| EP | 1 315 375 A2 | 5/2003 |
| EP | 1622371 A1 | 2/2006 |
| JP | 2003284008 A | 10/2003 |
| JP | 2004199304 A | 7/2004 |
| WO | 99/30493 A1 | 6/1999 |
| WO | WO 99/63759 | 12/1999 |
| WO | 00/33576 A1 | 6/2000 |
| WO | 00/74378 A1 | 12/2000 |
| WO | WO 01/03425 A1 | 1/2001 |
| WO | 01/78381 A2 | 10/2001 |
| WO | 02/087245 A1 | 10/2002 |
| WO | WO 2004/049208 A1 | 6/2004 |
| WO | WO 2004/063892 A2 | 7/2004 |
| WO | PCT/CA2005/001932 | 9/2006 |
| WO | PCT/CA2006/000626 | 1/2007 |
| WO | PCT/CA2006/001623 | 1/2007 |
| WO | PCT/CA2006/001440 | 6/2007 |

OTHER PUBLICATIONS

Bell Rings in Holidays with iTV: Marketnews.ca, Nov. 22, 2006, 3 pages, http://www.marketnews.ca/news_detail.asp?nid=2344.

Nagravision, Conditional Access Solutions—Secure your Business and Drive Subscriber Revenue, http://www.nagravision.com/pdf/ConditionalAccessSolutions.pdf, 2 pages.

DNTV Live! EPG, http://digitalnow.com.au/manual/images/epg.jpg, Nov. 21, 2005, 1 page.

Channel Line-up by DSI—Thursday, Jan. 6, 2005, 11:26 AM, 1 page, http://www.displaysystemsintl.com/graphics/bottom_half_frame_shadow.jpg.

Office Action dated Jun. 25, 2009 in connexion with U.S. Appl. No. 11/571,041.

Office Action dated Nov. 6, 2009 in connection with Canadian Patent Application 2,570,741.

Supplementary European Search Report issued by the European Patent Office dated Nov. 30, 2010 in connection with European Patent Application Serial No. 06741396.3, 3 pages.

Office Action issued by the United States Patent and Trademark Office dated Sep. 21, 2010 in connection with U.S. Appl. No. 12/063,197, 24 pages.

Office Action issued by the Canadian Intellectual Property Office dated Oct. 4, 2010 in connection with Canadian Patent Application Serial No. 2,570,705, 5 pages.

Office Action issued by the United States Patent and Trademark Office dated Mar. 17, 2011 in connection with U.S. Appl. No. 11/571,041, 24 pages.

Office Action dated Aug. 22, 2011 in connection with U.S. Appl. No. 12/063,197, 29 pages.

Notice of Allowance issued by the United States Patent and Trademark Office dated Oct. 13, 2011 in connection with U.S. Appl. No. 11/571,041, 9 pages.

Supplementary European Search Report issued by the European Patent Office dated Nov. 4, 2011 in connection with European Patent Application Serial No. 06790618.0, 5 pages.

Office Action issued by the European Patent Office dated Nov. 22, 2011 in connection with European Patent Application Serial No. 06790618.0, 6 pages.

(56) References Cited

OTHER PUBLICATIONS

Office Action dated Jan. 24, 2011 in connection with U.S. Appl. No. 12/063,197, 33 pages.

* cited by examiner ary of the drawings in conjunction with the

METHOD, SYSTEM AND APPARATUS FOR CONVEYING PERSONALIZED CONTENT TO A VIEWER

FIELD OF THE INVENTION

This invention relates to the field of telecommunications in general and, more specifically, to a method, system and apparatus for conveying personalized content to a viewer who uses a receiver to watch television.

BACKGROUND OF THE INVENTION

Television channels can be broadly categorized into "general interest" television channels and "specialized" television channels. A typical general interest television channel broadcasts a sequence of programs having a wide variety of target audiences. A general interest television channel may thus carry news programs, in combination with entertainment programs, sports programs, movies, commercials and the like. A typical specialized television channel, on the other hand, usually broadcasts a number of programs having a somewhat narrower scope. A given specialized television channel may thus be dominated by, for example, sport events, news segments, music events, or children's programs, to name a few. Examples of specialized television channels include the Cable News Network (CNN), the Weather Network and MTV.

Despite their differences, both general interest television channels and specialized television channels suffer from a common drawback, namely that the content of a television channel in question is developed with a view to satisfying the viewing needs of a relatively large group of television viewers. The size of the group is dictated by economic perspectives, which at some point makes it less and less attractive (from the service provider's perspective) to offer increasingly specialized television channels targeting smaller and smaller audiences. Therefore, techniques need to be developed in order to allow personalized content to be delivered alongside general interest and specialized television channels. Television viewers are also beginning to demand personalized content or, in other words, content that has been compiled to satisfy a particular need of a particular television viewer and which may, but likely is not, of interest to other television viewers. However, this is not achievable using existing broadcast techniques.

For example, in a direct-to-home satellite television distribution system, the broadcasting of a personalized "delivery token" has been contemplated. Specifically, for the delivery of small amounts of personalized content, the delivery token contains the personalized content, and is broadcast on every channel of every transponder frequency of a satellite. However, this is wasteful of the scarce available bandwidth in direct-to-home satellite distribution systems. Moreover, the scarcity of the bandwidth becomes a serious obstacle as either the amount of personalized content or the number of recipients simultaneously demanding their respective personalized content increases.

Another attempt at delivering personalized content consists of transmitting the personalized delivery token on a unique channel of a single, pre-determined, transponder frequency. While this approach saves bandwidth, it results in a clumsy user experience. Specifically, because the viewer's receiver may be tuned to a different transponder frequency during arrival of the personalized content via the unique channel, the viewer needs to tune the receiver to the appropriate channel of the appropriate transponder in synchronisation with arrival of the personalized content.

As such, the type and amount of personalized content that can be delivered using prior art approaches is severely limited. Clearly, therefore, there is a need in the industry for an improved solution for delivering personalized content to the television viewer.

SUMMARY OF THE INVENTION

According to a first broad aspect of this invention, there is provided a method for conveying personalized content to a viewer associated with a receiver. The method comprises generating control data indicative of a receiver-accessible source of personalized content for the viewer; and inserting the control data into a plurality of control streams for transmission to the receiver, each of the control streams being accessible to the receiver when in a different respective operational state.

According to a second broad aspect of the present invention, there is provided an apparatus for enabling conveyance of personalized content to a viewer associated with a receiver. The apparatus comprises means for generating control data indicative of a receiver-accessible source of personalized content for the viewer and means for inserting the control data into a plurality of control streams for transmission to the receiver, each of the control streams being accessible to the receiver when in a different respective operational state.

According to a third broad aspect of the present invention, there is provided a system. The system comprises a distribution network operable to convey at least a plurality of control streams to at least one receiver associated with a viewer, each of said control streams being accessible to the at least one receiver when in a different respective operational state. The system further comprises a content provider coupled to the distribution network, the content provider comprising: a processing module configured to generate control data indicative of a receiver-accessible source of personalized content for the viewer; and a transmission module configured to insert said control data into said plurality of control streams for transmission to the at least one receiver.

These and other aspects and features of the present invention will now become apparent to those skilled in the art upon review of the following description of specific embodiments of the invention in conjunction with the accompanying drawings.

BRIEF DESCRIPTION OF THE DRAWINGS

Embodiments of the present invention are described with reference to the following figures, in which.

It is to be expressly understood that the description and drawings are only for the purpose of illustration of certain embodiments of the invention and are an aid for understanding. They are not intended to be a definition of the limits of the invention.

DETAILED DESCRIPTION OF EMBODIMENTS

Figure 1:
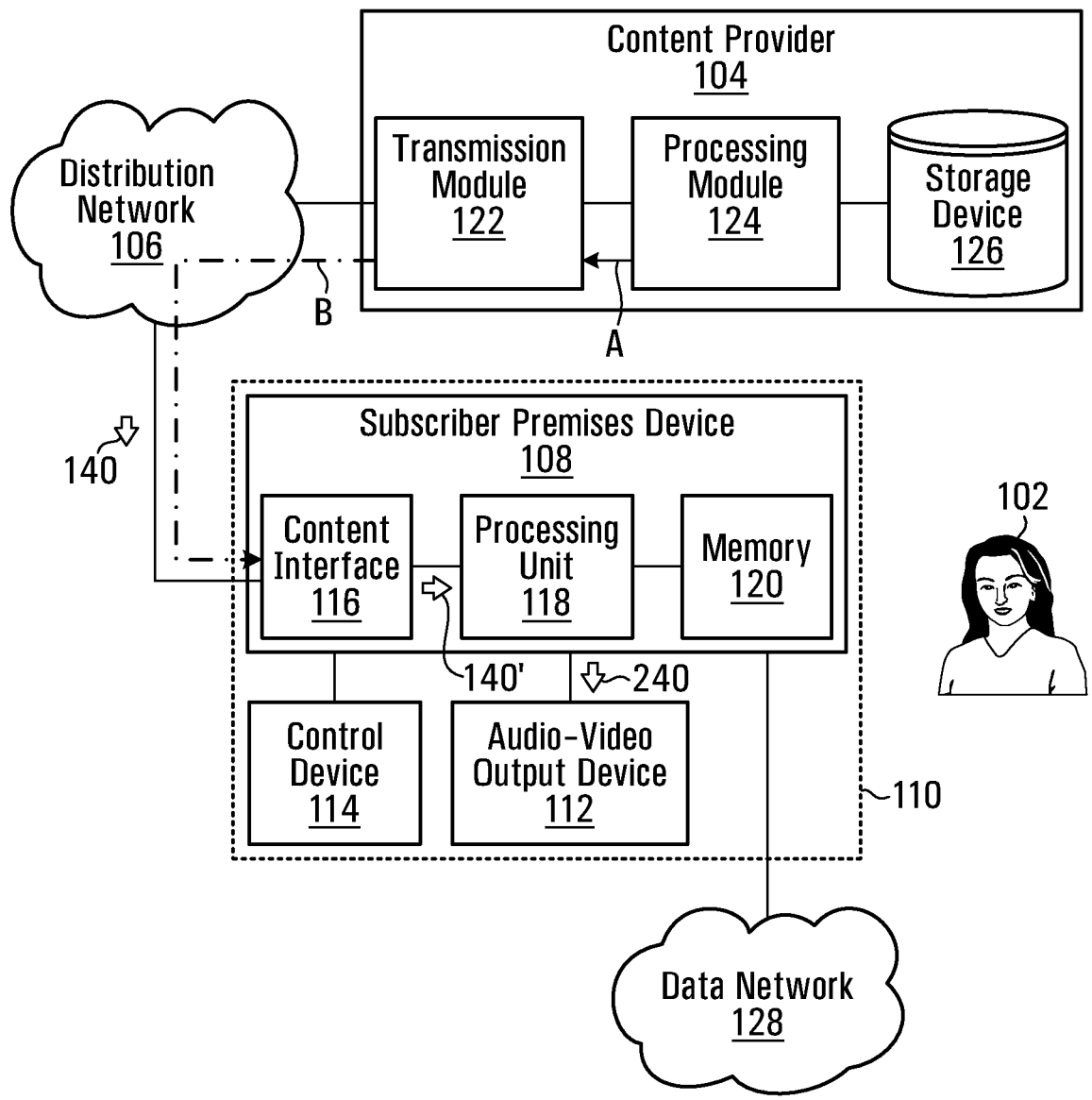
FIG. 1 is a schematic diagram representing a non-limiting embodiment of an architecture for delivering via a distribution network one or more television channels from a content provider to a television viewer having a subscriber premises device.

With reference to FIG. 1, there is shown a non-limiting embodiment of an architecture in which a television viewer 102 receives one or more television channels from a content provider 104 via a distribution network 106. The one or more television channels include television channels selected by the television viewer 102 in accordance with his or her viewing preferences from a set of television subscription packages or stand-alone television channels offered by the content provider 104.

Suitable types of distribution network 106 that can transmit one or more television channels between the content provider 104 and the television viewer 102 include, but are not limited to, a satellite distribution system, an xDSL television distribution system, a cable distribution system and the like. Within these types of distribution network 106, the television viewer 102 can be provided with a subscriber premises device 108 installed at a subscriber premises 110. The subscriber premises device 108 can comprise a set-top box, a receiver device, a modem, a residential gateway, a network interface device and the like. The subscriber premises device 108 is connectable to an audio-video output device 112 (such as, but not limited to, a television screen, a monitor and the like) and a control device 114 (such as, but not limited to, a remote control, a keyboard or another suitable control device). A non-limiting example of the subscriber premises device 108 can be embodied in a set-top box manufactured by EchoStar of 9601 South Meridian Blvd., Englewood, Colo., USA.

The subscriber premises device 108 comprises a content interface 116 coupled to the distribution network 106. The type of the content interface 116 depends on the type of the distribution network 106 used, in other words, on whether the distribution network 106 comprises one of the aforementioned satellite distribution system, xDSL television distribution system, cable distribution system and the like. For example, in the case where the distribution network 106 is a satellite distribution system, the content interface 116 can comprise a reception device (such as a satellite dish, an antenna or the like, typically installed outside the subscriber premises 110, such as on the side of a house or on the roof), outside/inside wiring between the reception device and the remainder of the subscriber premises device 108, as well as a tuner/decoder. Alternatively, in the case where the distribution network 106 is a cable distribution system, the content interface 116 can comprise a coaxial cable interface. In the case where the distribution network 106 is an xDSL television distribution system, the content interface 116 can comprise an xDSL modem.

Generally speaking, the content interface 116 comprises suitable circuitry, software and/or control logic for receiving a signal 140 from the content provider 104 via the distribution network 106. In some embodiments of the present invention, the subscriber premises device 108 may comprise two or more content interfaces similar to the content interface 116. For example, in one specific non-limiting embodiment of the present invention, a first content interface 116 may comprise a first tuner/decoder and a second content interface 116 may comprise a second tuner/decoder. The subscriber premises device 108 can further comprise a processing unit 118 for performing various functions to be described herein below and a memory 120. The processing unit 118 can be implemented in software, hardware, control logic or a combination thereof. The memory 120 can be implemented in any suitable type of memory, such as random-access memory or any other suitable type of memory.

Figure 2:
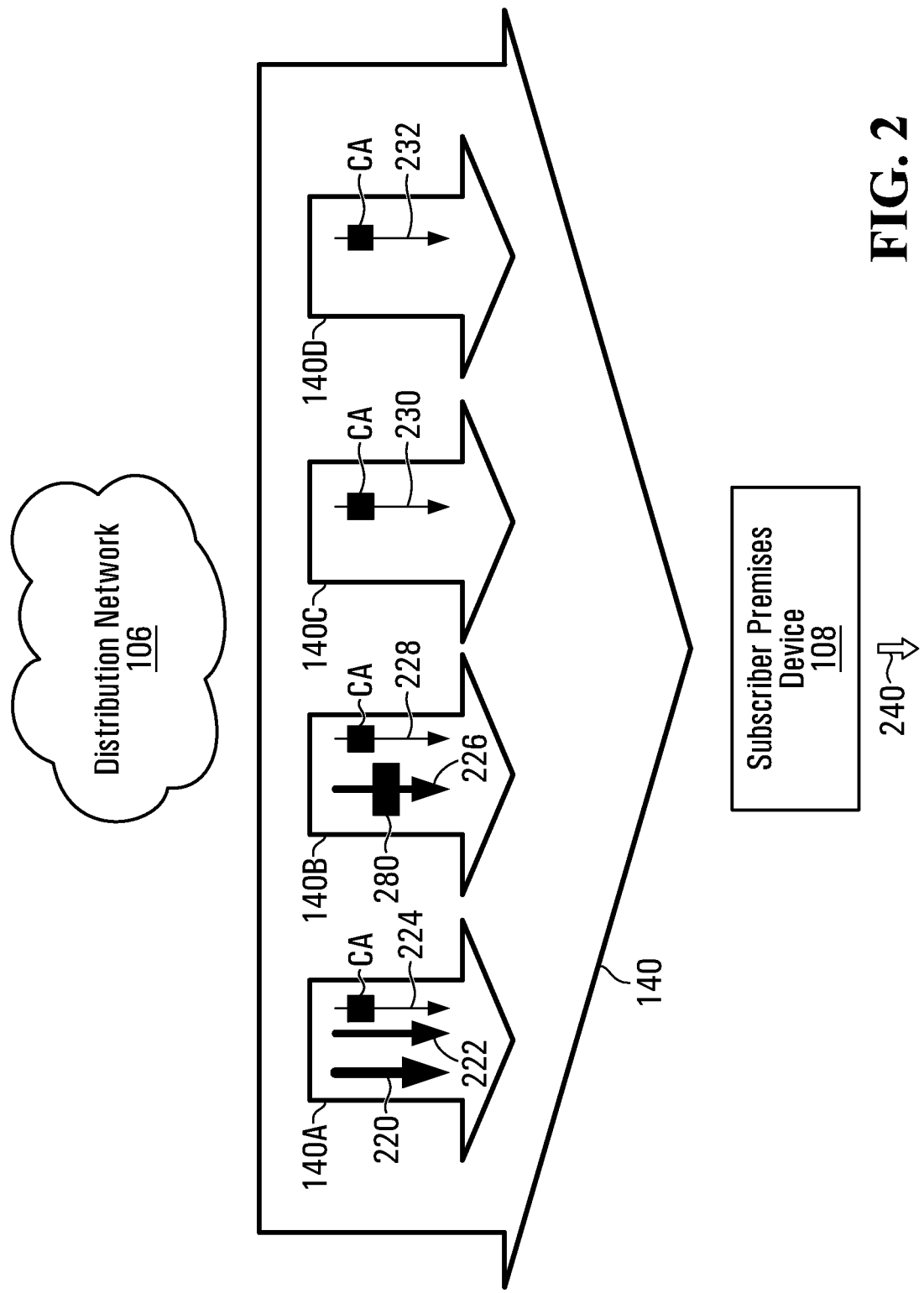
FIG. 2 is a non-limiting example depiction of a signal for delivering the one or more television channels to the television viewer, the signal comprising a plurality of transport streams.

The signal 140 can be a broadcast signal. For the sole purpose of simplifying the present description, only one example of the broadcast signal used within the satellite distribution system will be used herein below to continue to describe embodiments of the present invention. It is expected that those of skill in the art will readily appreciate how the teachings presented herein can be applied to other types of transport streams used in other types of distribution network 106 (ex. the xDSL television distribution system, the cable distribution system, etc.). In the specific non-limiting embodiment where the distribution network 106 is a satellite distribution system, the signal 140 can comprise a number of transport streams, each such transport stream being associated with a corresponding transponder frequency of a satellite (not depicted) of the distribution network 106. With reference to FIG. 2, a specific non-limiting embodiment of such transport stream will now be described in greater detail.

In the specific non-limiting embodiment of the signal 140 depicted in FIG. 2, the signal 140 is being transmitted via the distribution network 106 destined for a plurality of receiver devices, including the subscriber premises device 108. The signal 140 can comprise a number of transport streams, such as transport streams 140A, 140B, 140C and 140D. In this specific non-limiting scenario, each of the transport streams 140A, 140B, 140C and 140D can be associated with a different transponder frequency of the satellite (not depicted) utilized within the distribution network 106. Even though only four transport streams 140A-140D associated with four transponder frequencies are depicted, it should be understood that the signal 140 can comprise a number of additional transport streams associated with a number of additional transponder frequencies of the satellite (not depicted) of the distribution network 106. For example, in some non-limiting embodiments of the present invention, the signal 140 can comprise up to 32 transponder frequencies, each such transponder frequency being associated with a transport stream similar to the transport streams 140A-140D. However, it should be explicitly understood that the number of transponder frequencies or other type of transport streams within the signal 140 is not particularly limited.

Each transport stream 140A-140D (as well as other transport streams potentially present within the signal 140, but not depicted in this non-limiting example) can be associated with a transport stream identifier which uniquely identifies each of the transport streams 140A-140D. The purpose of the transport stream identifier will be discussed in greater detail herein below. In the specific non-limiting example of the distribution network 106 being embodied in a satellite distribution system, this transport stream identifier can be embodied in a transponder identifier.

In the specific non-limiting embodiment depicted in FIG. 2, the transport stream 140A can comprise three elementary streams, namely, an elementary stream 220, an elementary stream 222 and an elementary stream 224. In some embodiments of the present invention, each of the elementary streams 220, 222, 224 may convey one of a video stream, an audio stream or a data stream associated with a particular television channel. Naturally, the elementary streams 220, 222, 223 may convey other types of data streams, such as, for example, a data stream carrying an interactive application, a control stream carrying conditional access control data, a data stream carrying data associated with an Electronic Programming Guide or other types of data streams. In a specific non-limiting example to be presented herein below, the elementary stream 220 may carry a video stream associated with a 24-hour news channel. The elementary stream 222 may carry an audio stream associated with the 24-hour news channel. In the specific example depicted in FIG. 2, the elementary stream 224 may convey a control stream, such as, for example, a conditional access stream used for transmitting conditional access-related control data (ex. encryption keys, authorization keys and the like). Naturally, the transport stream 140A may comprise a number of additional elementary streams, which have been omitted from FIG. 2 for the sake of simplicity.

In the non-limiting embodiment depicted in FIG. 2, the elementary streams 220, 222, 224 may have different bandwidth allocated to each of them. The allocation of bandwidth may depend on several parameters, such as, but not limited to, the type of data being transmitted via a particular one of the elementary streams 220, 222, 224; for example whether the particular one of the elementary streams 220, 222, 224 is associated with a standard definition television channel, a high definition television channel, a control stream, a stream carrying the Electronic Programming Guide data and the like. As such, the bandwidth allocated to the elementary stream 220 can be different from the bandwidth allocated to the elementary stream 222, which is depicted in FIG. 2 by using arrows of different thickness. It should be understood that the bandwidth allocated to the specific elementary stream within a particular transport stream (i.e. on a particular transponder frequency) can be dynamically varied depending on the needs of the content being conveyed via the specific elementary stream. It is economical to allocate less bandwidth to elementary streams that convey relatively static content, such as a news program having a news anchor reading the latest news. On the other hand, elementary streams conveying action-filled content (such as a high quality movie or a sports event) require more bandwidth. A non-limiting example of such an arrangement is depicted in FIG. 2 by way of depicting the elementary stream 220 with a thicker arrow than the elementary stream 222, thus illustrating that a larger bandwidth is allocated to the elementary stream 220.

The elementary stream 224, on the other hand, may be allocated narrower bandwidth than elementary streams 220, 222. Since in the specific non-limiting example of FIG. 2, the elementary stream 224 comprises a control stream, one can expect that the control data it carries may not require as much bandwidth as, for example, data transmitted over elementary streams 220, 222. Accordingly, the elementary stream 224 is depicted with a thinner arrow in FIG. 2 than the elementary streams 220, 222.

The transport stream 140B can comprise two elementary streams, an elementary stream 226 and an elementary stream 228. The elementary stream 226 can be substantially similar to the aforementioned elementary streams 220, 222 in that it can convey audio or video streams associated with a general interest television channel or a specialized television channel, or alternatively a data stream, an Electronic Programming Guide stream or the like. In an alternative non-limiting embodiment of the present invention, the elementary stream 226 can be designated as a receiver-accessible source, as will be described in greater detail herein below. The elementary stream 228 may carry the aforementioned control stream, such as, for example, a conditional access stream used for transmitting conditional access-related control data (ex. encryption keys, authorization keys and the like). In the same manner, each of the transport streams 140C, 140D can comprise a number of respective elementary streams. However, for the sake of simplicity, the transport stream 140C is depicted as comprising a single elementary stream 230, which can, for example, carry a control stream. By the same token, the transport stream 140D is depicted as comprising a single elementary stream 232, which can, for example, also carry a control stream.

It is worthwhile noting that the data conveyed via the elementary stream 226, for example, will be generally different from the data conveyed via the elementary stream 220 or elementary stream 222 (even though some overlap in content is possible and occurs from time to time). On the other hand, the control data conveyed via the elementary streams 224, 228, 230 and 232 will be generally the same. In other words, the aforementioned content provider 104 will distribute the same control data on all the available control streams, in this case carried by the elementary streams 224, 228, 230 and 232. How this can be used for distributing different types of control data will be described in greater detail herein below.

Each of the elementary streams 220, 222, 224, 226, 228, 230 and 232 (as well as other elementary streams potentially present within the signal 140, but not depicted in this non-limiting example) can be associated with an elementary stream identifier, which uniquely identifies each of the elementary streams 220, 222, 224, 226, 228, 230 and 232 for the purposes of processing by a receiver, as will be described in greater detail herein below. In a non-limiting embodiment of the present invention, the elementary stream identifier can be embodied in a data element usually referred to as a Program ID, a Packet Identifier or, simply, PID.

It should be understood that a particular television channel may be associated with more than one elementary stream, for example, the particular television channel may be associated with two or more elementary streams, one for carrying the video stream and at least one for carrying the audio stream. It should therefore be apparent that knowledge of a particular transport stream identifier (ex. the transponder identifier) and one or more particular elementary stream identifiers (ex. one or more PIDs) associated with a particular television channel, allows a receiver to isolate and receive the particular television channel by identifying the correct elementary stream(s) based on the one or more particular elementary stream identifiers and by identifying the correct transport stream based on the particular transport stream identifier.

With continued reference to FIGS. 1 and 2, operation of the subscriber premises device 108 in the context of receiving and processing the signal 140 will now be described in greater detail. Recalling that in some embodiments of the present invention the subscriber premises device 108 may comprise a single content interface 116, in these non-limiting embodiments of the present invention, the subscriber premises device 108 may decode elementary streams transmitted via a single transport stream at any given time. In other words, a single content interface 116 may "tune" to a single transport stream at any given time. In the non-limiting embodiments of the present invention where the subscriber premises device 108 comprises two content interfaces 116, the subscriber premises device 108 may effectively be tuned to two transport streams at any given time.

Figure 4:
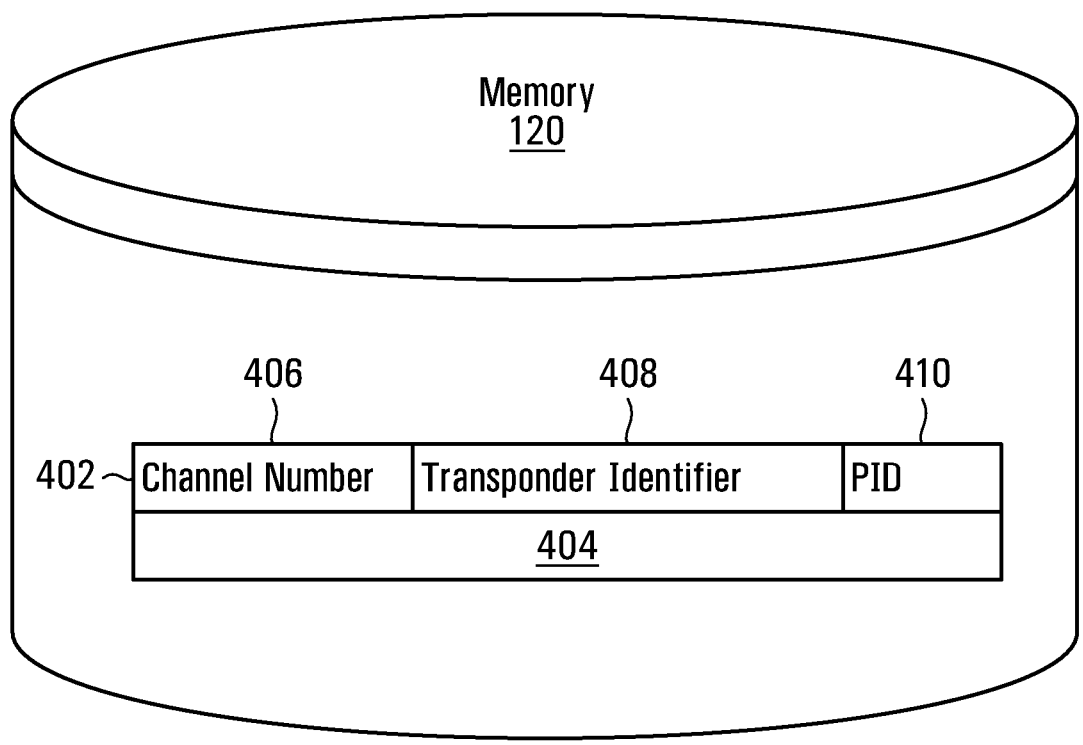
FIG. 4 is a non-limiting embodiment of a mapping maintained by the subscriber premises device of FIG. 1.

The aforementioned memory 120 of the subscriber premises device 108 can maintain a mapping, a non-limiting embodiment of which will now be described in greater detail with reference to FIG. 4. Specifically, in a non-limiting embodiment illustrated in FIG. 4, the memory 120 can maintain a record 402 associated with a specific television channel. The record 402 can contain a field 406 that stores data representative of a channel number that is known to the television viewers as being associated with the specific television channel. For example, such channel number can be entered by the television viewer 102 using the control device 114 to indicate the television viewer's 102 desire to view the specific television channel. The channel number associated with the specific television channel can also appear within an Electronic Programming Guide as presented by the processing unit 118 and conveyed to the television viewer 102 via the audio-video output device 112.

The record 402 further contains a field 408 that contains an indication of the transponder identifier associated with the particular television channel (i.e. a transport stream identifier, such as an identifier of a particular one of the transport streams 140A-140D, which is the transport stream associated with the particular television channel) and a field 410 that contains an indication of at least one PID associated with the particular television channel (i.e. one or more elementary stream identifiers, such as an identifier of a particular one or more of the elementary streams 220, 222, 226, which are the elementary streams conveying video and/or audio and/or data streams associated with the particular television channel).

How the record 402 gets populated is known to those of skill in the art and, as such, need not be discussed here in detail. Suffice it to say, that in some embodiments of the present invention, the record 402 can be populated and dynamically updated based on a so-called network information table (NIT) containing program specification information (PSI) distributed by the content provider 104 via one or more of the elementary streams (such as elementary streams 220, 222, 224, 226, 228, 230 and 232) of the transport streams 140A-140D.

Based on the content of the record 402, the processing unit 118 can perform a translation of a channel number entered by the television viewer 102 using the control device 114 into a corresponding transport stream identifier (such as the transponder identifier) and corresponding one or more elementary stream identifiers (such as the PID(s)) to enable the content interface 116 to "receive" the particular television channel conveyed within the signal 140 or, put another way, to retrieve content of the particular television channel from the corresponding elementary stream(s) of the corresponding transport stream. As a non-limiting illustration, the video stream associated with the aforementioned 24-hour news channel may be transmitted via the elementary stream 220 of the transport stream 140A and the audio stream associated with the 24-hour news channel may be transmitted via the elementary stream 222 of the transport stream 140A. Let's now assume that the record 402 is associated with this 24-hour news channel. As such, the field 406 can contain an indication of the channel number associated with this 24-hour news channel, which can be, for example, "24". In other words, the television viewer 102 would need to key in "24" using the control device 114 to decode the 24-hour news channel. The field 408 can contain an indication of the transport stream identifier associated with the transport stream 140A and the field 410 can contain an indication of the elementary stream identifiers associated with each of the elementary streams 220, 222.

When the television viewer 102 keys in "24" using the control device 114, the processing unit 118 accesses the content of the record 402 and translates the channel number "24" into the respective transport stream identifier associated with the transport stream 140A and the elementary stream identifiers associated with the elementary streams 220, 222. Equipped with this translated information, the processing unit 118 can cause the content interface 116 to retrieve the content being currently aired on the 24-hour news channel by decoding the audio and video streams from the corresponding elementary streams 220, 222 of the corresponding transport stream 140A. Thus, it is apparent that the processing unit 118 is operable to cause retrieval of a particular television channel from a plurality of television channels being broadcast as part of the signal 140 based on an instruction generated by the television viewer 102. In other words, the processing unit 118 can cause the content interface 116 to "decode" the particular television channel selected from a plurality of television channels being broadcast as part of the signal 140. This process of "decoding" the particular television channel is depicted by a signal 140' in FIG. 1 transmitted between the content interface 116 and the processing unit 118 to enable further processing thereof.

The processing unit 118 can be further configured to process the content of the particular television channel into a format suitable, for example, for outputting to the audio-video output device 112 or recording to a hard drive or other storage device (such as, for example, the memory 120). This process of retrieving content of a particular television channel from the signal 140 is depicted in FIG. 1 and FIG. 2 as a signal 240 outputted by the subscriber premises device 108, the signal 240 being a representation of the particular television channel retrieved from the signal 140 in a format suitable for presentation on the audio-video output device 112 or suitable for recording.

Similar records 404 can be maintained for other particular television channels and the corresponding transport stream identifiers and elementary stream identifiers. Even though it has been shown that the records 402, 404 are maintained in the memory 120 and are accessed by the processing unit 118, it should be understood that in an alternative non-limiting embodiment of the present invention, the records 402, 404 can be accessed by an application being executed on the processing unit 118, such as an application responsible for generating and conveying the Electronic Programming Guide to the television viewer 102 or another suitable application.

Returning to FIG. 1, a non-limiting embodiment of the content provider 104 can comprise a transmission module 122, a processing module 124 and a storage device 126. The processing module 124 can be operable to generate content of one or more television channels to be transmitted as part of the signal 140. How the processing module 124 generates such content is known to those of skilled in the art and, as such, will not be described here in detail. The processing module 124 can further be configured to perform several additional functions, as will be described in greater detail herein below.

The transmission module 122 can be operable to transmit the signal 140 via the distribution network 106 to one or more receivers coupled to the distribution network 106, such as the subscriber premises device 108. Naturally, the type of the transmission module 122 will depend on the type of the distribution network 106. For example, in a non-limiting example where the distribution network 106 comprises a satellite distribution system, the transmission module 122 is operable to broadcast the content of the one or more television channels via one or more elementary streams (such as the aforementioned elementary streams 220, 222, 226 of FIG. 2) multiplexed into one of the transponder frequencies (as represented by the aforementioned transport streams 140A-140D of FIG. 2, for example). Put another way, the transmission module 122 is operable to encode video, audio and data streams associated with each of the one or more television channels into a respective one of the aforementioned elementary streams 220, 222, 226 multiplexed into one of the aforementioned transport streams 140A-140D.

The storage device 126 can be used for storing a plethora of information, such as, but not limited to, feature content used for generating the signal 140, data representative of subscriber profiles associated with subscribing users (such as, for example, the television viewer 102), billing information, pay-per-view content, video-on-demand content and the like.

The processing module 124, or a portion thereof, can perform inter alia a conditional access functionality, which can be generally defined as functionality to control what television channels each of the subscribing users (such as, for example, the television viewer 102) can access and view. Based on the subscriber profiles maintained in the storage device 126, the processing module 124 is operable to generate a conditional access control signal destined for a particular receiver associated with a particular subscribing user, such as, for example, the subscriber premises device 108 associated with the television viewer 102. In some embodiments of the present invention, the conditional access control signal can comprise an authorization key for the subscriber premises device 108, the authorization key being indicative of what television channels broadcast within the signal 140 the subscriber premises device 108 is authorized to retrieve. In other embodiments of the present invention, the conditional access control signal can comprise a re-authorization key, which can be generated and transmitted in response to, for example, the television viewer 102 changing his or her subscription package. In yet further alternative non-limiting embodiments, the conditional access control signal can comprise a decryption key which can be used by the subscriber premises device 108 to decrypt content broadcast within the signal 140.

Irrespective of the type of control data conveyed by the conditional access control signal, the conditional access control signal comprises an identifier of a destination device for which it is destined. In the specific non-limiting example being presented herein, because the control signal is destined for the subscriber premises device 108, the identifier of the destination device will correspond to an identifier of the subscriber premises device 108. In some non-limiting embodiments of the present invention, the identifier of the subscriber premises device 108 can comprise a MAC address of the subscriber premises device 108. In an alternative non-limiting embodiment of the present invention, the identifier of the subscriber premises device 108 can comprise an IP address associated with the subscriber premises device 108. In yet further non-limiting embodiments of the present invention, the identifier of the subscriber premises device 108 can comprise a proprietary identifier which may be used for addressing the subscriber premises device 108 exclusively for the purposes of transmission of control signals or may be used for addressing the subscriber premises device 108 for the purposes of transmission of control signals, as well as for transmission of other type of signals and data. It should be expressly understood that the identifier of the subscriber premises device 108 may be of any suitable type.

Once the processing module 124 has generated the conditional access control signal, it transmits the so-generated conditional access control signal to the transmission module 122, as depicted by an arrow "A" in FIG. 1. Upon receipt of the conditional access control signal, the transmission module 122 is operable to transmit the conditional access control signal to the designated recipient (as indicated by the identifier of the destination device), such as, the subscriber premises device 108 associated with the television viewer 102. How the transmission module 122 transmits the conditional access control signal will naturally depend on the type of the distribution network 106 deployed. In the specific non-limiting example where the distribution network 106 comprises a satellite distribution system, the transmission module 122 is configured to transmit the conditional access control signal via one or more control streams. It will be recalled from the description of FIG. 2 that each of the transport streams 140A, 140B, 140C and 140D can include a control stream, such as the elementary streams 224, 228, 230 and 232 respectively. In this specific non-limiting embodiment, the transmission module 122 can be configured to replicate and broadcast the conditional access control signal on each conditional access stream, i.e. on each of the elementary streams 224, 228, 230 and 232. This is depicted in FIG. 2 by a token Conditional Access or, simply, "CA" being transmitted on each of the elementary streams 224, 228, 230 and 232 and generally depicted as line "B" in FIG. 1.

Now, with continued reference to a specific non-limiting example where the distribution network 106 is embodied in a satellite distribution system, it should be appreciated that by transmitting the conditional access control signal via each of the elementary streams 224, 228, 230 and 232 of each of the respective transport streams 140A, 140B, 140C and 140D or, in other words, broadcasting the conditional access control signal on each of the transponder frequencies of the satellite (not depicted) of the distribution network 106, the content provider 104 ensures that the conditional access control signal can be received and processed by all receivers coupled to the distribution network 106, including the subscriber premises device 108, irrespective of the receivers' respective operational state. Put another way, each of the receivers coupled to the distribution network 106, including the subscriber premises device 108, will be able to decode the respective conditional access stream and to retrieve and process the conditional access control signal, irrespective of which transponder frequency (i.e. transport streams 140A-140D) a particular receiver is tuned to at the time of the receipt of the conditional access control signal.

In some embodiments of the present invention, the processing unit 118 of the subscriber premises device 108 may execute an application which monitors the respective control stream (i.e. elementary streams 224, 228, 230 and 232) of the respective transport stream (i.e. one of the transport streams 140A-140D) it is currently tuned to and retrieves the conditional access control signal therefrom. In one specific non-limiting example, the application may be a dedicated application that is used solely for the purposes of monitoring and retrieval of control data. In another specific non-limiting example, the application may be a shared application and, as such, may perform other functions, such as, for example, controlling generation and presentation of the Electronic Programming Guide or any other suitable type of a shared application.

In an alternative non-limiting embodiment of the present invention, the monitoring and retrieval of the conditional access control signal can be performed by an operating system loaded onto the processing, unit 118. Upon receipt of the conditional access control signal, the processing unit 118 under control of the operating system examines the content of the received conditional access control signal and, more specifically, retrieves the aforementioned identifier of the destination device. If the identifier of the destination device matches the identifier of the subscriber premises device 108, the processing unit 118 retrieves the remaining content of the conditional access control signal. If the identifier of the destination device retrieved from the conditional access control signal does not match the identifier of the subscriber premises device 108, the processing unit 118 ignores the received conditional access control signal.

Continuing with the description of FIG. 1, in some non-limiting embodiments of the present invention, the subscriber premises device 108 can be further coupled to a data network 128. In one specific non-limiting embodiment of the present invention, which is particularly applicable where the distribution network 106 comprises an xDSL television distribution system, the data network 128 and the distribution network 106 can co-exist as respective portions of a single transport network, such as, for example, the Public Switched Telephone Network. In this specific non-limiting embodiment, the subscriber premises device 108 can be connectable to the data network 128 via the content interface 116. In an alternative non-limiting embodiment of the present invention, the data network 128 can be implemented in a data network which is separate from the distribution network 128. For example, if the distribution network 106 comprises a satellite distribution system, the data network 128 may traverse the Internet, a local area network and the like. In these non-limiting embodiments of the present invention, the subscriber premises device 108 may be configured to exchange data via the data network 128 via a data network interface (not depicted), such as, but not limited to, a dial-up modem, a high speed modem or any other suitable means for exchanging data via a network. In some embodiments of the present invention, the content provider 104 may also be coupled to the data network 128. In such embodiments, the subscriber premises device 108 may exchange data with the content provider 104 via the data network 128. For example, in a specific non-limiting embodiment of the distribution network 106 comprising a satellite distribution system, the subscriber premises device 108 may use the data network 128 as a "return channel" to the content provider 104, for example, to convey a request for pay-per-view movie and the like.

Figure 3:
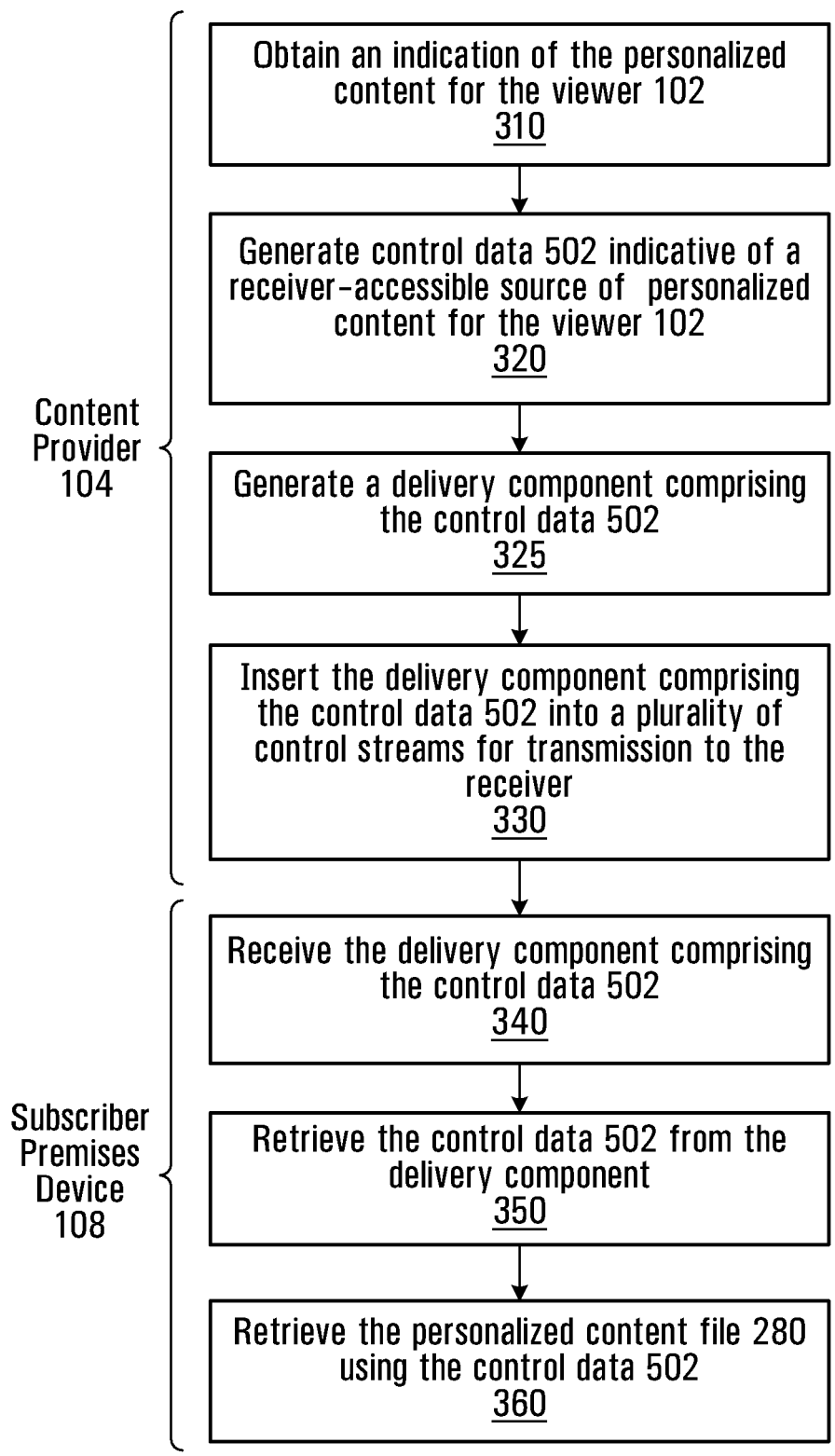
FIG. 3 depicts a non-limiting embodiment of a method flow for conveying personalized content to the television viewer.

Given the architecture of FIG. 1, it is possible to perform a method for delivering personalized content according to various non-limiting embodiments of the present invention. Reference is now made to FIG. 3, which depicts a specific non-limiting embodiment of a method for delivering personalized content to a viewer who uses a receiver to watch television.

Step 310

The method starts at step 310, where an indication of personalized content for the viewer is obtained by the content provider 104. How the indication of personalized content for the viewer is obtained and the type of personalized content is not particularly limited and several non-limiting embodiments will now be presented. It should be understood that these non-limiting embodiments are presented as examples and should not be used to limit the scope of the present invention.

Content of a "New" Television Channel

In a first non-limiting embodiment of the present invention, the personalized content can take the form of a "new" television channel to which the subscriber premises device 108 should change to from the current television channel to which the subscriber premises device 108 may be tuned to. For example, based on viewer preferences and based on an indication of the new television channel, the subscriber premises device 108 may start receiving the new television channel instead of the television channel which it is currently receiving. Within a system for causing such channel change it is useful to distribute a channel change invitation to the subscriber premises device 108, the channel change invitation comprising the indication of the new television channel, for causing the subscriber premises device 108 to tune to the new television channel. In this non-limiting scenario, the indication of the personalized content (i.e. the indication of the new television channel) for the viewer 102 can be received from a system responsible for triggering a channel change, for example a channel change in accordance with viewer preferences. An example of such a system is disclosed in Canadian patent application number 2,524,586 to Ratsch et al., which was filed on Oct. 27, 2005. The content of this patent application is incorporated by reference herein in its entirety.

Instant/Electronic Message

In a second non-limiting embodiment of the present invention, the personalized content can take the form of an instant message (or another type of a peer-to-peer message) originated by a message originator (not depicted) and destined for the television viewer 102. In this non-limiting embodiment, the indication of personalized content for the television viewer 102 can be provided by the message originator. In a first non-limiting example, the message originator can input the instant message using his or her receiver and the associated control device (similar to the subscriber premises device 108 and the associated control device 114). How the inputted message is transmitted to the processing module 124 of the content provider 104 will depend on the type of the receiver used by the message originator and the type of the distribution network 106. For example, in the above-described non-limiting scenario where the distribution network 106 comprises a satellite distribution system, the inputted message may be transmitted to the content provider 104 via the data network 128.

In a second non-limiting example, the message originator can input the instant message using a computing apparatus (such as a desktop computer, a laptop and the like) connected to a data network, which may be the same as, or connected to, the data network 128 and the like. In a third non-limiting example, the message originator can input the instant message using a wireless communication device (such as a cellular phone, a PDA and the like). Other ways to input the instant message destined for the television viewer 102 are of course possible.

Irrespective of how the message originator inputs the instant message, the instant message may comprise a content portion and an address portion. The address portion can be indicative of a destination device for the instant message, such as for example the identifier of the subscriber premises device 108 or an identifier associated with the destination party (such as, the television viewer 102) which may then be translated into the identifier associated with the subscriber premises device 108. The content portion can comprise a message to be conveyed to the television viewer 102 and may include text, graphics and the like.

In substantially the same manner, the personalized content may comprise an electronic (e-mail) message destined for the television viewer 102. In this non-limiting embodiment, the indication of personalized content for the television viewer 102 can be provided by an e-mail server (not depicted) responsible for handling e-mail messages destined for the television viewer 102. For example, after an e-mail message arrives at the e-mail server, the e-mail server may transmit a copy of the received e-mail message to the processing module 124, as well as an indication of a destination party. In one specific non-limiting embodiment, the indication of the destination party may comprise an e-mail address associated with the television viewer 102, which may then be translated by the processing module 124 into an identifier suitable for addressing receiver devices coupled to the distribution network 106, such as, for example, the identifier of the subscriber premises device 108.

It should be expressly understood that the personalized content may include any other suitable type of electronic message that may contain graphics, video, voice, data, an SMS or a combination thereof directed to the television viewer 102.

Targeted Message

In a third non-limiting embodiment of the present invention, the personalized content can take the form of a targeted message, such as a personalized advertisement, an emergency notification message, a personalized weather report, a location monitoring message and the like. In these non-limiting embodiments, the indication of the personalized content for the viewer (i.e. for the television viewer 102) is received from a respective system responsible for generating the personalized content. For example, in the case of the advertising message, the indication of the personalized content is received from the advertisement agency that is responsible for an advertising campaign for a vendor of the product or service being advertised. In this example, the indication of the personalized content will include the advertising message, as well as an indication of a recipient's identity, such as, for example, an identifier of the subscriber premises device 108 in case of the television viewer 102.

As another example, the personalized content may take the form of the aforementioned location monitoring message. In this non-limiting example, the indication of personalized content may be generated by a system responsible for tracking location of an individual or an asset. Accordingly, the location monitoring message may, for example, comprise a map that depicts the current location of the individual or the asset being tracked. Alternatively, the location monitoring message may include a warning message generated when the individual or the asset being tracked enters a particular geographic area or exits a particular geographic area.

In another example of the personalized content taking the form of a personalized weather report, the indication of personalized content may be received from a system responsible for generating such personalized weather reports. It should be further understood that the personalized content can comprise other types of reports, such as traffic reports, weather reports, financial reports, sporting events reports, news reports, zodiac reports, dating profile report and the like. An example of such a system that generates personalized reports is disclosed in PCT patent application number PCT/CA2005/001932 to Ratsch et al., filed on Dec. 20, 2005. The content of this patent application is incorporated herein by reference in its entirety.

File

In another non-limiting embodiment of the present invention, the personalized content may take the form of a file comprising text, graphics, video, voice, data elements or a combination thereof. For example, the personalized content may take the form of a photo to be transmitted to the television viewer 102. In this specific non-limiting embodiment, the file may be downloaded by a message originator (not depicted). In a first non-limiting example, the message originator can download the file using a receiver (similar to the subscriber premises device 108), which may be equipped with a data medium reader, such as a CD reader, a flash memory reader, a USB reader and the like. In a second non-limiting example, the message originator can download the file using a computing apparatus (such as a desktop computer, a laptop and the like) connected to a data network, which may be the same as, or connected to, the distribution network 106; the same as, or connected to, the data network 128 and the like. In a third non-limiting embodiment of the present invention, the message originator can download the file using a wireless communication device (such as a cellular phone, a PDA and the like). Other ways to download the file destined for the television viewer 102 are of course possible.

Irrespective of how the message originator downloads the file, the message originator also provides an indication of a destination device to which the file is to be transmitted, such as for example an identifier of the subscriber premises device 108. For example, the message originator may provide an indication of an identifier associated with a receiver associated with the destination party (such as, for example, an indication of the identifier of the subscriber premises device 108). In an alternative non-limiting embodiment, the message originator may provide another type of an identifier associated with the television viewer 102, which may be later translated by the processing module 124 into the identifier associated with the subscriber premises device 108.

It should be noted that other types of personalized content, and, other ways to obtain the indication of personalized content, are possible. For example, the personalized content may take the form of a personalized message associated with an upcoming service event pertaining to the distribution network 106 and the content provider 104 may wish to deliver the personalized message to the television viewer 102. In this non-limiting embodiment, the processing module 124 can itself generate the indication of the personalized content. Likewise, the content provider 104 may send a personalized promotional message to a particular subscribing user (ex. the viewer 102) who has reached a particular milestone (for example, has been a subscriber for a pre-determined period of time, has purchased a certain number of features and the like). Alternatively, the content provider 104 may send a personalized message containing account information. Again, in this non-limiting embodiment, the processing module 124 can itself generate the indication of the personalized content. In an alternative non-limiting embodiment of the present invention, the personalized content may comprise a voice message or a voice/video message destined for the television viewer 102.

In yet further embodiments, the personalized content may comprise a pay-per-view program or a video-on-demand program ordered by the television viewer 102. How the television viewer 102 orders such a movie is known to those of skill in the art and, as such, need not be discussed here in detail. Suffice it to say, that the television viewer 102 may interact with the content provider 104 to have the purchase of the movie authorized. Upon authorization of the movie purchase, the processing module 124 may further generate the indication of personalized content destined for the television viewer 102.

It should be expressly understood that further alternative non-limiting forms of the personalized content are possible. Such examples include, but are not limited to, surveys, audio content, "digital clippings" from newspapers or magazines, excerpts from digital media, portions of a web page, and the like.

It should thus be understood that the type of personalized content is not particularly limited and may include any type of personalized content. In other words, it can take the form of any type of content that has been compiled with a view to target a particular viewer (such as the television viewer 102). It should be further understood that, even though, the personalized content may have been compiled with the view to target the particular television viewer (such as, in the case being presented herein, the television viewer 102), it may or may not be of interest to other viewers. Take an example of the personalized content comprising an instant message. Unless the television viewer 102 is involved in a multi-party chat, this type of personalized content is unlikely to be of interest to other viewers. On the other hand, a particular personalized weather report compiled for the television viewer 102 may be of interest to other television viewers residing or working in the same geographic area or otherwise. By the same token, an e-mail message destined for the television viewer 102 may be categorized as personalized content of interest only to the television viewer 102, but if there are other recipients specified in one of a "TO:", "CC:", or "BCC:" fields of the e-mail message, this personalized content may be of interest to more than one viewer.

Accordingly, it is within the scope of the present invention for the personalized content being transmitted as part of embodiments of the present invention to be of interest to either a single viewer or more than one viewer.

Step 320

Next, at step 320, the processing module 124 generates control data indicative of a receiver-accessible source of personalized content. Firstly, the processing module 124 associates personalized content destined for the television viewer 102 with the receiver-accessible source of personalized content. To this end, the processing module 124 downloads a file (or another suitable data element) containing the personalized content destined for the television viewer 102 to the receiver-accessible source accessible by the subscriber premises device 108. This file containing the personalized content destined for the television viewer 102 is referred to herein below as a personalized content file 280.

With reference to FIG. 2, in a first specific non-limiting embodiment, the receiver-accessible source of personalized content can comprise an elementary stream multiplexed into one of the aforementioned transport streams 140A-140D, such as one of the above-described elementary streams 220, 222, 226. For example, the processing module 124 may designate the elementary stream 226 as the receiver-accessible source of personalized content. The elementary stream 226 may thus act as a delivery vehicle for the personalized content-file 280. Accordingly, the processing module 124 may encode the personalized content file 280 into the elementary stream 226. It should be noted that the elementary stream 226 has been used as an example only and it should be understood that the processing module 124 may designate one or more elementary streams (such as elementary streams 220, 222, 226 or any other transport stream) as the receiver-accessible source for personalized content.

With reference to FIG. 1, in a second specific non-limiting embodiment, the receiver-accessible source of personalized content can be accessible to the subscriber premises device 108 via the data network 128. For example, the receiver-accessible source can comprise a portion of the storage device 126, which can be accessible via the data network 128. In another non-limiting embodiment of the present invention, the receiver-accessible source may comprise a web server (not depicted) accessible via the data network 128. Accordingly, in these non-limiting examples, the processing module 124 may download the personalized content file 280 onto the portion of the storage device 126 or onto the web server (not depicted).

As an illustration, consider a non-limiting example of the personalized content comprising an instant message destined for the television viewer 102. The processing module 124 can, therefore, download the personalized content file 280 containing the content of the instant message onto the aforementioned elementary stream 226, which may have been designated as the receiver-accessible source. As another illustration, consider a non-limiting example of the personalized content comprising a personalized weather report destined for the television viewer 102. The processing module 124 can, therefore, download the personalized content file 280 containing the content of the personalized weather report to a web server (not depicted), accessible by the subscriber premises device 108 via the data network 128 at a specific network address.

It should be noted that in some embodiments of the present invention, there may be no need to download the personalized content file 280 containing the personalized content destined for the television viewer 102, as it may already be downloaded to a source that is accessible to the subscriber premises device 108. Consider a non-limiting example of the personalized content comprising an e-mail message destined for the television viewer 102. The content of the e-mail message, may already be located at a server accessible to the subscriber premises device 108 via the data network 128, such as, for example, a server responsible for handling e-mails destined for the television viewer 102. Accordingly, the processing module 124 may not need to download the personalized content per se, but rather indicate the current location of the personalized content destined for the television viewer 102 and verify that the current source of the personalized content is accessible by the subscriber premises device 108 associated with the television viewer 102.

In another non-limiting embodiment of the present invention, it is contemplated that the personalized content file 280 may be already downloaded to the receiver-accessible source. For example, the personalized content file 280 may contain personalized content that may be of interest to more than one destination party, i.e. to the television viewer 102, as well as other television viewers. For example, the personalized content file 280 may contain a traffic report for a particular metropolitan area. This traffic report may be of interest to more than one television viewer. Accordingly, the personalized content file 280 containing the traffic report may be used to deliver the personalized content to more than one television viewer. As such, if the personalized content file 280 is already at the receiver-accessible source, there may be no need to download it again. Instead, the processing module 124 may indicate the current location of the personalized content file 280 containing the personalized content of interest and destined for the television viewer 102 and verify that the current source of the personalized content is accessible by the subscriber premises device 108 associated with the television viewer 102.

It should be noted that in some embodiments of the present invention there may be no need to generate the personalized content file 280. This approach is particularly applicable in non-limiting embodiments where the personalized content takes the form of the aforementioned new television channel within a system for causing a channel change in accordance with television viewer 102 preferences.

In some embodiments of the present invention, the receiver-accessible source may directly correspond or, in other words, be uniquely associated with the personalized content file 280. In this non-limiting scenario, knowledge of a network address (or another suitable identifier) associated with the receiver-accessible source may be sufficient to retrieve the personalized content file 280. To illustrate, consider the following example. In the above-described scenario where the receiver-accessible source is accessible via the data network 128, the receiver-accessible source may be uniquely associated with the personalized content file 280 containing personalized content destined for a particular viewer, such as, for example, a file containing a still image destined for the television viewer 102. Accordingly, knowledge of the network address (or another suitable identifier) of the receiver-accessible source may be sufficient to enable retrieval of the personalized content file 280.

Figure 6:
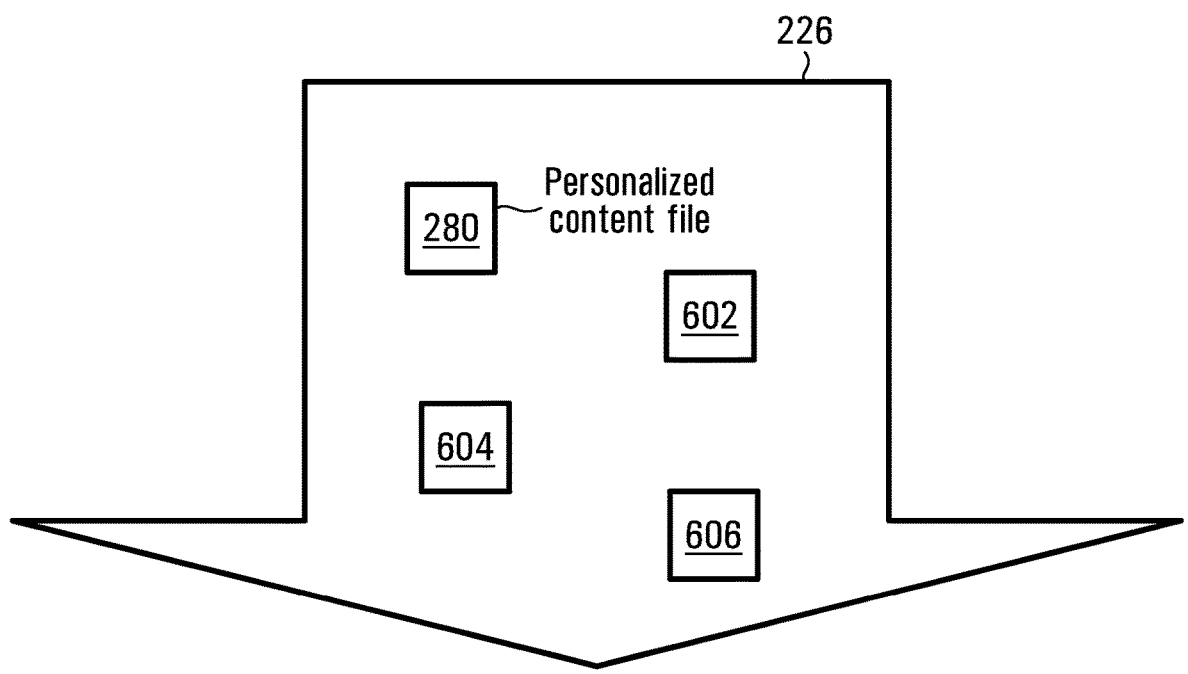
FIG. 6 is a schematic illustration of a non-limiting embodiment of a receiver-accessible source for delivering personalized content destined for the television viewer.

In other non-limiting embodiments of the present invention, the receiver-accessible source may not directly correspond or, in other words, be uniquely associated with the personalized content file 280. For example, in the non-limiting scenario where the receiver-accessible source comprises an elementary stream (ex. the elementary stream 226) multiplexed into one of the aforementioned transport streams 140A-140D, the receiver-accessible source may not be uniquely associated with the personalized content file 280. An illustration of this non-limiting scenario will now be presented with reference to FIG. 6, which depicts a non-limiting embodiment of the elementary stream 226. The processing module 124 may have designated the elementary stream 226 as the receiver-accessible source. As such, the processing module 124 will multiplex the personalized content file 280 destined for the television viewer 102, as well as personalized content files containing personalized content destined for other television viewers (such as for example, a personalized content file 602, a personalized content file 604 and a personalized content file 606) onto the elementary stream 226. Accordingly, in some non-limiting embodiments of the present invention, a personalized content identifier may be assigned to each of the personalized content files 280, 602, 604 and 606 being conveyed via the elementary stream 226 to uniquely identify each of the personalized content files 280, 602, 604 and 606 being broadcast therein. It should be expressly understood that the type of the personalized content carried within the personalized content files 280, 602, 604 and 606 need not necessarily be of the same type. Accordingly, it should be apparent that the elementary stream 226 may be used for delivering personalized content of different type to respective destination parties (i.e. respective television viewers, including the television viewer 102).

In some embodiments of the present invention, the personalized content file 280 may comprise more than one type of personalized content. In an alternative non-limiting embodiment of the present invention, the personalized content file 280 may contain multiple instances of personalized content of the same type. As a non-limiting illustration, the personalized content file 280 may include the following non-limiting combinations of personalized content:

an instant message and a photo of the originator;
a weather report and a traffic report;
a traffic report and a video of the traffic;
two or more stock reports;
a voicemail and an e-mail message;
statistics report for two or more sports events.

Naturally, other combinations of other types of personalized content are possible and the above list is meant as an example only.

Figure 5:
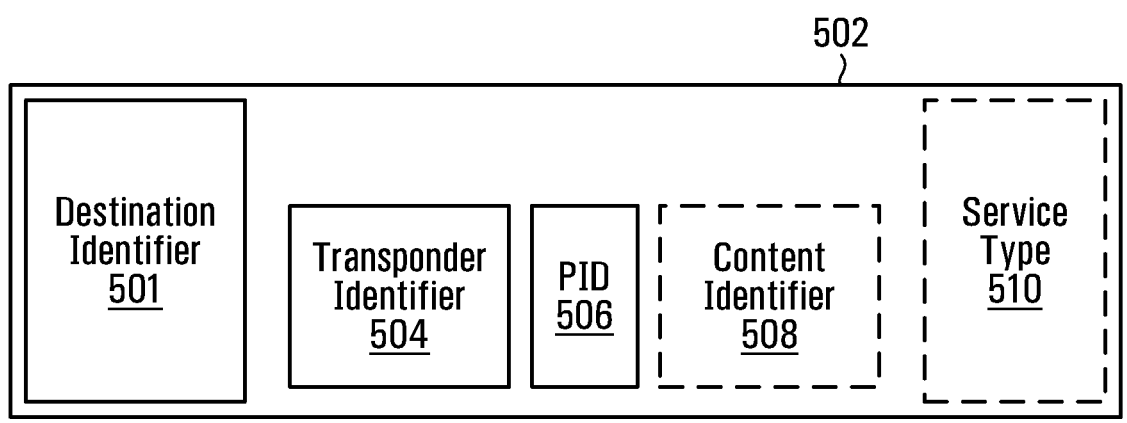
FIG. 5 is a non-limiting embodiment of a delivery component for delivering control data indicative of a receiver-accessible source of personalized content.

Continuing with the description of step 320 of the method of FIG. 3, once the personalized content file 280 is downloaded to the receiver-accessible source of personalized content, the processing module 124 compiles the aforementioned control data indicative of the receiver-accessible source where the personalized content file 280 has been downloaded to. An example of such control data will now be described in greater detail with reference to FIG. 5 which depicts a specific non-limiting embodiment thereof. More specifically, FIG. 5 depicts control data 502. The control data 502 comprises a destination identifier 501. Generally speaking, the purpose of the destination identifier 501 is to identify a receiver associated with a destination party to which the delivery component is destined. In the specific non-limiting example being presented herein, the destination identifier 501 may comprise an identifier of the subscriber premises device 108 associated with the television viewer 102. In an alternative non-limiting embodiment of the present invention, which is particularly applicable where the personalized content may be of interest to more than one television viewer, the destination identifier 501 may comprise a respective identifier for each of the receivers associated with each of the television viewers for which the personalized content is destined.

The control data 502 further comprises an indication of the receiver-accessible source of personalized content. In some embodiments of the present invention, the control data 502 may comprise a transponder identifier 504 and a PID 506. In some non-limiting embodiments of the present invention, the control data 502 may optionally comprise a content identifier 508 which contains the personalized content identifier which uniquely identifies a particular personalized content file (such as, for example, the personalized content file 280 destined for the television viewer 102). In some embodiments of the present invention, which are particularly applicable where the personalized content comprises more than one type of personalized content, the control data 502 may comprise two or more content identifiers 508. Accordingly, the control data 502 comprises data that can enable the subscriber premises device 108 to retrieve the personalized content file 280 having the appropriate personalized content identifier from the appropriate elementary stream of the appropriate transport stream.

In some non-limiting embodiments of the present invention, the control data 502 may further optionally comprise a service type 510, indicative of the type of personalized content that the control data 502 points to. The purpose of the service type 510 will be described in greater detail herein below.

The control data 502 can be expressed in any suitable language. For illustration purposes an example of the control data 502 can be expressed in XML:

```
<Service type 510><Instant Message>
<Destination identifier 501><85566998562>
   <Transponder identifier 504><7643>
           <PID 506><31>
   <Content identifier 508></HEIL0187>
```

Naturally, the control data 502 may comprise additional information, such as, for example, data identifying the content provider 104 and the like.

In an alternative non-limiting embodiment of the present invention, the indication of the receiver-accessible source of personalized content maintained within the control data 502 may be indicative of a network address at which the receiver-accessible source can be reached via the data network 128, such as an IP address, a SIP address, a URL, a URI and the like. Accordingly, in these non-limiting embodiments of the present invention, the control data 502 may, for example, be expressed in XML as follows:

```
<Destination identifier 501><85566998562>
         <URI><125.76.24.113>
```

It should be noted that any other suitable type of identifier of a receiver-accessible source can be used.

As a non-limiting illustration of an embodiment where the personalized content file 280 may be destined for more than one television viewer, an example of the control data 502 can be expressed as follows:

```
<Service type 510><Instant Message>
<Destination identifier 501a><85566998562>
<Destination identifier 501b><765-GF-6559>
<Destination identifier 501c><SP-655589999>
   <Transponder identifier 504><7643>
           <PID 506><31>
```

As a non-limiting illustration of an embodiment where the personalized content file 280 may comprise more than one type of personalized content, an example of the control data 502 can be expressed as follows:

```
<Service type 510><Instant Message>
<Destination identifier 501><85566998562>
   <Transponder identifier 504><7643>
           <PID 506><31>
   <Content identifier 508><356-IM>
      <Service type 510><Photo>
         <URI><125.76.24.113>
```

It should be apparent that how the control data 502 is compiled is not particularly limited and may depend on business considerations of the content provider 104. To illustrate, consider the following non-limiting examples:

A Weather Report and a Traffic Report

Firstly, consider a non-limiting example where the television viewer 102 may have requested a weather report and a traffic report. In some embodiments of the present invention, the control data 502 may comprise an indication of the receiver-accessible sources for both the weather report and the traffic report. In an alternative non-limiting embodiment of the present invention, separate control data 502 may be generated for each of the traffic report and the weather report.

A Weather Report and an Instant Message

Secondly, consider a non-limiting example where the television viewer 102 has requested a weather report and has an instant message destined for him or her. In some non-limiting embodiment of the present invention, the control data 502 may comprise an indication of the receiver-accessible sources for both the weather report and the instant message. In an alternative non-limiting embodiment, separate control data 502 may be generated for each of the traffic report and the instant message. The latter approach may be particularly applicable in embodiments, where a portion of the personalized content (i.e. the weather report) may be of interest to more than one television viewer and a portion of the personalized content (i.e. the instant message) may be of interest to a single television viewer only. Effectively, the control data 502 for the portion of the personalized content that may be of interest to more than one television viewer may be "re-used" to transmit the personalized content to more than one television viewer, for example, by including multiple destination identifiers 501 or by transmitting the control data 502 to multiple destination parties (i.e. the television viewer 102, as well as other television viewers who are interested in this particular personalized content).

Step 325

Returning to the description of the method of FIG. 3, at step 325 the processing module 124 generates a delivery component comprising the control data 502 generated in step 320.

The type of the delivery component generated will naturally correspond to the type of distribution network 106 used. In the above-mentioned non-limiting scenario where the distribution network 106 comprises a satellite distribution system, the delivery component may comprise a token suitable for transmission via a satellite. In the above-mentioned non-limiting scenario where the distribution network 106 comprises a cable distribution system, the delivery component may comprise a token suitable for transmission via the cable distribution system. In the above-mentioned non-limiting scenario where the distribution network 106 comprises an xDSL television distribution system, the delivery component may comprise a packet suitable for transmission via the xDSL television distribution system.

Step 330

At step 330, the processing module 124 transmits the delivery component comprising the control data indicative of the receiver-accessible source of personalized content to the transmission module 122 in substantially the same manner as was described above in respect to the processing module 124 transmitting the conditional access control signal and as depicted in a line "A" in FIG. 1.

The transmission module 122 then transmits the delivery component comprising the control data 502 indicative of the receiver-accessible source of personalized content via the distribution network 106. How the transmission module 122 transmits the delivery component comprising the control data 502 indicative of the receiver-accessible source of personalized content will naturally depend on the type of the distribution network 106 used. In the non-limiting example being presented herein where the distribution network 106 comprises a satellite distribution system, the transmission module 122 transmits the delivery component in substantially the same manner as has been described above in respect to the transmission module 122 delivering the conditional access control data and as depicted in a broken line "B" in FIG. 1. More specifically, the transmission module 122 can replicate and broadcast the delivery component onto the elementary streams 224, 228, 230 and 232, each of which comprises a control stream in the non-limiting example being presented herein.

It is worthwhile noting that in some embodiments of the present invention, the elementary streams 224, 228, 230, 232 may be embodied in control streams designated for conveying conditional access-related control data. Accordingly, in these non-limiting embodiments of the present invention, the elementary streams that have been designated for the purposes of transmitting conditional access-related signals (i.e. elementary streams 224, 228, 230 and 232) may be used for conveying the delivery component comprising the control data 502. However, in an alternative non-limiting embodiment of the present invention, the processing module 124 may designate a dedicated control stream within each of the transport streams 140A-140D for the purposes of conveying the delivery component comprising the control data 502. For example, in some embodiments of the present invention, the processing module 124 may designate a dedicated control stream on each of the transport streams 140A-140D (as well as other transport streams potentially present within signal 140, but not depicted in the specific embodiment of FIG. 2A) for the purposes of transmitting the delivery component. Yet in alternative non-limiting embodiments of the present invention, the processing module 124 may designate a control stream on each of the transport streams 140A-140D (as well as other transport streams potentially present within signal 140, but not depicted in the specific embodiment of FIG. 2A) which may be used for distributing the delivery component comprising the control data 502, as well as other types of data and content, including one or more television channels. It should be expressly understood that in some embodiments of the present invention, a control stream used for distributing the delivery component may be defined within two or more of the transport streams 140A-140D (as well as other transport streams potentially present within signal 140, but not depicted in the specific embodiment of FIG. 2A). In these non-limiting embodiments of the present invention, the delivery component comprising the control data 502 will be received in two or more of the respective operational states of the subscriber premises device 108.

It will now be apparent that in some non-limiting embodiments of the present invention the delivery component comprising the control data 502 may traverse the same "path" traversed by the personalized destined for the television viewer 102. This is particularly true in embodiments where both the delivery component comprising the control data 502 and the personalized content are distributed as part of the signal 140. In alternative non-limiting embodiments of the present invention, the delivery component comprising the control data 502 may traverse a different "path" from that traversed by the personalized destined for the television viewer 102. This is particularly true in embodiments where the delivery component comprising the control data 502 is distributed as part of the signal 140 and the personalized content is distributed, for example, using the data network 128.

Step 340

Next, at step 340, the subscriber premises device 108 receives the delivery component comprising the control data 502. Continuing with the non-limiting example where the distribution network 106 is embodied in a satellite distribution system, it is recalled that in some embodiments of the present invention, each of the transport streams 140A-140D includes a respective elementary stream (i.e. the elementary streams 224, 228, 230 and 232) that carries control data. It is further recalled that the delivery component has been transmitted via the control streams (i.e. the elementary streams 224, 228, 230 and 232). Accordingly, all the receivers (including the subscriber premises device 108) coupled to the distribution network 106 will receive the delivery component irrespective of their operational state or, in other words, irrespective to which of the transport streams 140A-140D, the particular one of the receivers is currently tuned to.

The receiving of the delivery component may be performed by the aforementioned application responsible for monitoring and receiving conditional access control signals and which is executed on the processing unit 118. In an alternative non-limiting embodiment, the receiving of the delivery component may be executed by another application executed on the processing unit 118, such as, for example the aforementioned application responsible for generating and conveying of the Electronic Programming Guide or by another application. In an alternative non-limiting embodiment of the present invention, receiving of the delivery component may be executed by the processing unit 118 under control of an operating system.

When the processing unit 118 of the subscriber premises device 108 under control of the operating system or an application being executed thereon receives the delivery component, it first examines the destination identifier 501. If the content of the destination identifier 501 does not match the identifier associated with the subscriber premises device 108, the processing unit 118 ignores the received delivery component. If, on the other hand, the content of the destination identifier 501 matches the identifier of the subscriber premises device 108, the processing unit 118 continues to examine the remainder of the delivery component. Naturally, in the non-limiting embodiments of the present invention where the delivery component may comprise more than one destination identifier 501, the processing unit 118 verifies if at least one of the destination identifiers 501 matches the identifier associated with the subscriber premises device 108.

In some non-limiting embodiments of the present invention, the processing unit 108 next examines the content of the service type 510. For example, the service type 510 may be indicative of a need to load a particular application or provide a particular message to the television viewer 102 via the audio-video output device 112. As a non-limiting illustration, the service type 510 may be indicative of the fact that the personalized content comprises an e-mail message destined for the subscriber premises device 108 and that an e-mail application may need to be loaded. The e-mail application may, in turn, present to the television viewer 102 via the audio-video output device 112 a message indicative of a fact that the e-mail message has been received. This can be achieved, for example, by generating a pop-up window, an icon or the like. In an alternative non-limiting embodiment, the e-mail application may solicit an indication of the television viewer's 102 desire to retrieve the e-mail message. It will be appreciated that different types of indicators maintained within the service type 510 may initiate different types of applications. As an illustration, consider the following non-limiting examples:
- a service type 510 indicative of the personalized content file 280 containing an instant message may invoke an instant message application;
- a service type 510 indicative of the personalized content file 280 containing a weather report may invoke a personalized report application;
- a service type 510 indicative of the personalized content file 280 containing a stock report may invoke a stock report application;
- a service type 510 indicative of the personalized content file 280 containing a voicemail may invoke a voicemail application.

In an alternative non-limiting embodiment of the present invention, the service type 510 may cause the processing unit 118 to first solicit the television viewer's 102 desire to receive the personalized content and to launch the corresponding application only in respond to receipt of a positive confirmation from the television viewer 102. As an illustration, consider the following non-limiting example. The processing unit 118 may retrieve the service type 510 from the delivery component and determine that the service type 510 is indicative of the personalized content file 280 containing an instant message destined for the television viewer 102. The processing unit 118 may then cause the audio-video output device 112 to display a message or an icon advising the television viewer 102 that an instant message destined for the television viewer 102 is available. If the television viewer 102 confirms his or her desire to retrieve the instant message, the processing unit 118 may then launch the instant message application.

Step 350

Next, at step 350, the processing unit 118 retrieves a portion of the control data 502 that comprises the indication of the receiver-accessible source of personalized content from the delivery component. In the specific non-limiting embodiment where the control data 502 comprises the transponder identifier 504, the PID 506 and the content identifier 508, the processing unit retrieves data contained within these fields. As has been described in more detail above, the control data 502 may include other types of the indication of the receiver-accessible source of personalized content.

Step 360

Equipped with this information, at step 360, the processing unit 118 causes the content interface 116 to retrieve the personalized content file 280 associated with the content identifier 508 from the receiver-accessible source. Several alternatives are contemplated of how the content interface 116 may retrieve the personalized content file 280.

A Single Content Interface 116

It will be recalled that in some embodiments of the present invention, the subscriber premises device 108 may comprise a single content interface 116. Accordingly, in these non-limiting embodiments of the present invention, the content interface 116 can decode the elementary stream associated with the PID 506 (i.e. the elementary stream 226) of the transport stream associated with the transponder identifier 504 (i.e. the transport stream 140B). The content interface 116 may retrieve the personalized content file 280 associated with the content identifier 508 and transmit the received personalized content file 280 to the processing unit 118, which may process it into a format suitable, for example, for displaying via the audio-video output device 112 or recording in memory.

In these non-limiting embodiments of the present invention, the content interface 116 may not be tuned to more than one transport stream at any given time. Therefore, depending which transport stream the content interface 116 is tuned to at the time when the delivery component is processed and depending on which transport stream carries an elementary stream that has been designated as a receiver-accessible source of personalized content, the content interface 116 may or may not be able to continue receiving the content of the television channel it was previously receiving while retrieving the personalized content file 280.

In other words, the content interface 116 may not be able to continue receiving the same television channel which the content interface 116 was receiving prior to accessing the receiver-accessible source of personalized content, if the transport stream associated with elementary stream(s) conveying the audio and video streams associated with the television channel that the content interface 116 was previously receiving is different from the transport stream that is associated with the elementary stream that has been designated as the receiver-accessible source of personalized content. Therefore, in some embodiments of the present invention, the processing unit 118 may store in the memory 120 an indication of an "original television channel" that the content interface 116 was receiving prior to retrieval of the personalized content file 280 to enable the content interface 116 to resume receiving the original television channel once the personalized content is retrieved.

In another non-limiting scenario, where the transport stream associated with the elementary stream(s) conveying the audio and video streams associated with the television channel that the content interface 116 was receiving happens to be the same as the transport stream that is associated with the elementary stream that has been designated as the receiver-accessible source of personalized content, the content interface 116 may be able to continue receiving the television channel while retrieving the personalized content file 280.

Naturally, in some embodiments of the present invention, the processing unit 118 may query the television viewer 102 via the audio-video output device 112 to ascertain the television viewer's 102 desire to retrieve the personalized content prior to causing the content interface 116 to discontinue receiving the then current television channel and to retrieve the personalized content.

Consider the following non-limiting illustration, where the personalized content comprises an instant message destined for the television viewer 102. It is assumed that at the time of receiving the control data indicative of the receiver-accessible source of personalized content, the content interface 116 is receiving a television channel, a video stream of which is conveyed via the elementary stream 220 and an audio stream of which is conveyed via the elementary stream 222 of the transport stream 140A. Upon receipt of the control data indicative of the receiver-accessible source of personalized content and provided that the television viewer 102 has indicated his or her desire to retrieve the personalized content (if an appropriate query was presented), the processing unit 118 causes the content interface 116 to retrieve the personalized content from the receiver-accessible source (in this example, the elementary stream 226 of the transport stream 140B)

and processes the received instant message by displaying the instant message via the audio-video output device 112. Once the content interface 116 has retrieved the personalized content from the receiver-accessible source, the processing unit 118 may cause the content interface 116 to resume receiving the "original television channel" (i.e. the television channel conveyed via the elementary streams 220, 222 of the transport stream 140A), the indication of which had been stored in the memory 120.

Multiple Content Interfaces 116

It is recalled that in some non-limiting embodiments of the present invention, the subscriber premises device 108 may comprise multiple content interfaces 116, such as, for example, two content interfaces 116. As a non-limiting illustration, assume that the personalized content comprises an instant message destined for the television viewer 102 and that at the time of receiving the control data indicative of the receiver-accessible source of personalized content, the aforementioned first content interface 116 is receiving a television channel, a video stream and an audio stream of which are conveyed via the elementary streams 220, 222 of the transport stream 140A. Upon receipt of the control data indicative of the receiver-accessible source of personalized content and provided that the television viewer 102 has indicated his or her desire to retrieve the personalized content (if an appropriate query was presented), the processing unit 118 causes the aforementioned second content interface 116 to retrieve the personalized content from the receiver-accessible source (in this example, the elementary stream 226 of the transport stream 140B) and to process the received instant message by displaying the instant message via the audio-video output device 112. In these non-limiting embodiments the instant message may be displayed via the audio-video output device 112 simultaneously with displaying the content of the television channel that the first content interface 116 is receiving. For example, the instant message may be displayed in a pop-up window overlaid over at least a portion of a screen of the audio-video output device 112. In an alternative non-limiting embodiment of this invention, the instant message may be displayed while the television channel is being recorded for playback after the instant message has been displayed.

In an alternative embodiment of the present invention, where the control data may be indicative of a receiver-accessible source of personalized content accessible via the data network 128, the processing unit 118 can retrieve a network address of the receiver-accessible source from the control data. Equipped with this information, the processing unit 118 causes the aforementioned data network interface to retrieve personalized content file 280 from the receiver-accessible source via the data network 128. How the data network interface retrieves the personalized content file 280 will once again depend on the type of the data network 128. For example, a dial up modem connection may be established with the receiver-accessible source via the data network 128 to retrieve the personalized content. In an alternative non-limiting embodiment of the present invention, another type of connection, which may be established on-demand or may be always-on, may be used for retrieval of the personalized content file 280 from the receiver-accessible source. How the processing unit 118 processes the received personalized content file 280 can be implemented in substantially the same manner as described immediately above.

Naturally, how the processing unit 118 processes the personalized content file 280 containing the personalized content destined for the television viewer 102 will depend on the type of the personalized content in question. As an illustration, several non-limiting examples are provided herein below:

Instant Message/E-Mail Message/File/Personalized Report

In a first non-limiting example, the processing unit 118 (or an application being executed thereon) may retrieve the personalized content file 280 and process the personalized content by retrieving the personalized content from the personalized content file 280. The processing unit 118 may then convey the retrieved personalized content to the television viewer 102 via the audio-video output device 112. The personalized content may be displayed in a full display of the audio-video output device 112, in a pop-up window, as a picture-in-picture over a portion of available display real estate of the audio-video output 121 and the like. In an alternative non-limiting embodiment of the present invention, the instant message may be stored in memory 120 for later viewing by the television viewer 102. Naturally, the processing unit 118 may interact with the television viewer 102 in the process of retrieving and conveying the personalized content, such as, for example, to solicit the television viewer's 102 desire to retrieve and view the personalized content, the television viewer's 102 preference as to how to display the personalized content and the like.

Channel Change Invitation

In a second non-limiting example, which is particularly applicable in non-limiting embodiments where the personalized content comprises a channel change invitation, the processing unit 118 may process the personalized content in the following manner. Let's assume that the content interface 116 is currently receiving the aforementioned 24-hour news channel, a video stream of which is being transmitted via the elementary stream 220 and the audio component of which is being transmitted via the elementary stream 222 of the transport stream 140A (i.e. the "old" television channel). Let's further assume that the personalized content comprises a channel change invitation that is to cause the content interface 116 to decode a "Galaxy" music channel an audio stream of which is being transmitted on the elementary stream 226 of the transport stream 140B (i.e. the "new" television channel). In this non-limiting scenario, the delivery component may be expressed as follows:

<Service type 510><ChannelChange>
<Destination identifier 501><85566998562>
<Transponder identifier 504><7643>
<PID 506><31>

Upon receipt of the delivery component, the processing unit 118 examines the service type 510 and determines that the personalized content comprises a channel change invitation. In some embodiments of the present invention, the service type 510 may cause the processing unit 118 to launch an interactive channel change application. In an alternative embodiment of the present invention, the service type 510 may cause the processing unit 118 to confirm that the television viewer 102 approves of the process to execute the channel change invitation.

Next, the processing unit 118 executes the channel change invitation by causing the content interface 116 to start receiving a television channel that is being conveyed on the elementary stream being associated with the PID 506 "31" being associated with the transponder identifier 504 "7643". In the specific non-limiting example being presented herein, the processing unit 118 causes the content interface 116 to decode the "Galaxy" music channel, the audio stream of which is being transmitted via the elementary stream 226 of the transport stream 140B.

Of course, if the subscriber premises device 108 comprises two content interfaces 116, the subscriber premises device 108 may effectively receive both the old television channel and the new television channel. For example, the old television channel may be recorded in memory, while the television viewer 102 may be "watching" the new television channel. Alternatively, the new television channel may be recorded in memory while the television viewer 102 continues to watch the old television channel. In yet another alternative, both the old and the new television channel may be displayed to the television viewer 102 as a picture-in-picture using the video-audio output device 112.

In some embodiments of the present invention, the processing unit 118 may transmit a confirmation indicative of successful retrieval of the personalized content file 280. For example, the processing unit 118 may convey the confirmation to the content provider 104 via the data network 128 or through the distribution network 106. Upon receipt of the confirmation, the processing module 124 of the content provider 104 may remove the personalized content from the receiver-accessible source.

In an alternative non-limiting embodiment of the present invention, the processing module 124 may delete the personalized content file 280 destined for a particular recipient (such as the television viewer 102) after a pre-determined period of time has elapsed since the time when the personalized content file 280 was downloaded to the receiver-accessible source, such as, for example, after a period of 3 hours, 24 hours, a week, a month or any other suitable period of time.

As an illustration, consider the above-mentioned scenario where the personalized content comprises an instant message destined for the television viewer 102 and where the distribution network 106 comprises a satellite distribution system. In this specific non-limiting example, the personalized content file 280 containing the content of the instant message may be removed from the elementary stream 226 upon receiving a confirmation from the subscriber premises device 108 that the instant message has been received. Alternatively, the personalized content file 280 may be carouselled via the elementary stream 226, for a predetermined period of time, such as, for example, for a period of 24 hours. As another non-limiting example, the personalized content file 280 may be carouselled via the elementary stream 226 for an hour and then may be periodically carouselled via the elementary stream 226 in a pre-determined pattern (such as, for example, carousel the personalized content file 280 via the elementary stream 226 for half an hour starting at every hour, etc.) until the subscriber premises device 108 confirms the receipt of the instant message (for example, via the data network 128, as has been described above).

Accordingly, a system and a method for conveying personalized content to a television viewer who uses a receiver to watch television has been described. By transmitting control data indicative of a receiver-accessible source of personalized content via the control stream(s), the subscriber premises device 108 is enabled to receive the control data in a plurality of respective operational states of the subscriber premises device 108 and to retrieve the personalized content for the television viewer 102 from the receiver-accessible source, an indication of which is maintained within the control data. Persons skilled in the art will appreciate that there are yet more alternative implementations and modifications possible for implementing the present invention, and that the above implementations and examples are only illustrations of one or more embodiments of the present invention. The scope of the invention, therefore, is only to be limited by the claims appended hereto.

What is claimed is:

1. A method for conveying a plurality of messages to targeted viewers over a television distribution network transmitting a plurality of audio/video channels over a plurality of transponder frequencies, the method comprising:
   receiving a message, of the plurality of messages, directed to a particular viewer comprising information on at least one of:
      an instant message directed to the particular viewer;
      an indication of an e-mail message directed to the particular viewer;
      a short message service (SMS) text message directed to the particular viewer; and
      a voicemail directed to the particular viewer;
   determining a particular receiver associated with the particular viewer the received message is directed to;
   generating a personalized content identifier for the received message;
   generating personalized content control data comprising the generated personalized content identifier and an indication of the determined particular receiver;
   multiplexing and transmitting the message, of the plurality of messages, directed to the particular viewer along with additional messages, of the plurality of messages, directed to additional viewers onto a specific transponder frequency of the television distribution network designated for messages directed to viewers; and
   transmitting the personalized content control data, along with additional personalized content control data of the additional personalized content, on a plurality of the transponder frequencies of the television distribution network, each of the plurality of transponder frequencies further having respective video programming transmitted thereon.

2. The method of claim 1, wherein a size of the personalized content control data relative to a size of the message allows for efficient usage of available bandwidth of the television distribution network while providing notification to viewers of available messages regardless of a transponder frequency a receiver is tuned to.

3. The method of claim 1, wherein the personalized content control data and additional personalized content control data is transmitted in a control stream including conditional access information in addition to the personalized content control data and additional personalized content control data.

4. The method of claim 1, wherein the personalized content identifier of the personalized content control data includes a transponder ID and packet ID on which the personalized content identifier is transmitted on.

5. The method of claim 1, wherein the personalized content control data further includes an indication of a type of the message targeting the viewer.

6. The method of claim 5, wherein said indication of a type of the message is indicative of how the particular receiver should treat the message.

7. The method of claim 5, wherein said indication of a type of the message is instrumental in causing the particular receiver to launch an application, the application for retrieving the message using said personalized content control data.

8. The method of claim 5, wherein said indication of a type of the message is instrumental in causing the receiver to solicit the particular viewer's desire to retrieve the message.

9. A system for conveying a plurality of messages to targeted viewers over a television distribution network transmitting a plurality of audio/video channels over a plurality of transponder frequencies, the system comprising:
a processing unit for executing instructions;
memory storing instructions, which when executed by the processing unit configure the system to:
receive a message, of the plurality of messages, directed to a particular viewer comprising information on at least one of:
an instant message directed to the particular viewer;
an indication of an e-mail message directed to the particular viewer;
a short message service (SMS) text message directed to the particular viewer; and
a voicemail directed to the particular viewer;
determine a particular receiver associated with the particular viewer the received message is directed to;
generate a personalized content identifier for the received message;
generate personalized content control data comprising the generated personalized content identifier and an indication of the determined particular receiver;
multiplex and transmit the message, of the plurality of messages, directed to the particular viewer along with additional messages, of the plurality of messages, directed to additional viewers onto a specific transponder frequency of the television distribution network designated for messages directed to viewers; and
transmit the personalized content control data, along with additional personalized content control data of the additional personalized content, on a plurality of the transponder frequencies of the television distribution network, each of the plurality of transponder frequencies further having respective video programming transmitted thereon.

10. The system of claim 9, wherein a size of the personalized content control data relative to a size of the message allows for efficient usage of available bandwidth of the television distribution network while providing notification to viewers of available messages regardless of a transponder frequency a receiver is tuned to.

11. The system of claim 9, wherein the personalized content control data and additional personalized content control data is transmitted in a control stream including conditional access information in addition to the personalized content control data and additional personalized content control data.

12. The system of claim 9, wherein the personalized content identifier of the personalized content control data includes a transponder ID and packet ID on which the personalized content identifier is transmitted on.

13. The system of claim 9, wherein the personalized content control data further includes an indication of a type of the message targeting the viewer.

14. The system of claim 13, wherein said indication of a type of the message is indicative of how the particular receiver should treat the message.

15. The system of claim 13, wherein said indication of a type of the message is instrumental in causing the particular receiver to launch an application, the application for retrieving the message using said personalized content control data.

16. The system of claim 13, wherein said indication of a type of the message is instrumental in causing the receiver to solicit the particular viewer's desire to retrieve the message.

* * * * *